US009389493B2

(12) United States Patent
Nakayama et al.

(10) Patent No.: US 9,389,493 B2
(45) Date of Patent: Jul. 12, 2016

(54) PROJECTOR AND DISPLAY CONTROL METHOD FOR PROJECTOR WITH ORIENTATION CORRECTION

(71) Applicant: Seiko Epson Corporation, Tokyo (JP)

(72) Inventors: Tetsu Nakayama, Matsumoto (JP); Yoshihiro Tatara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 230 days.

(21) Appl. No.: 14/093,819

(22) Filed: Dec. 2, 2013

(65) Prior Publication Data

US 2014/0160443 A1  Jun. 12, 2014

(30) Foreign Application Priority Data

Dec. 7, 2012  (JP) .................. 2012-267977

(51) Int. Cl.
*G03B 21/14*  (2006.01)
*G03B 3/04*  (2006.01)
*G03B 27/68*  (2006.01)
*H04N 3/23*  (2006.01)
*H04N 9/31*  (2006.01)

(52) U.S. Cl.
CPC ............. *G03B 21/145* (2013.01); *G03B 3/04* (2013.01); *G03B 27/68* (2013.01); *H04N 3/23* (2013.01); *H04N 9/3185* (2013.01)

(58) Field of Classification Search
CPC ........ G03B 21/147; G03B 3/04; G03B 27/68; H04N 9/3185; H04N 3/23
See application file for complete search history.

(56) References Cited

U.S. PATENT DOCUMENTS

2010/0208149 A1\* 8/2010 Morikuni ................. G03B 3/00 348/744
2012/0140188 A1  6/2012 Yasuda et al.
2013/0093672 A1\* 4/2013 Ichieda ................ G03B 21/26 345/157

FOREIGN PATENT DOCUMENTS

JP  4772917  9/2011
JP  2012-118398  6/2012

\* cited by examiner

*Primary Examiner* — Toan Ton
*Assistant Examiner* — Magda Cruz
(74) *Attorney, Agent, or Firm* — ALG Intellectual Property, LLC

(57) ABSTRACT

A projector, that projects an image, includes a light source, a liquid crystal panel that modulates light output from the light source and forms an image in response to input image data, a projection optical device that projects the image formed by the liquid crystal panel, a control device that controls the liquid crystal panel, and an acceleration sensor that detects a position of the projector. The control device includes a determination unit that determines whether or not the position detected by the acceleration sensor is a predetermined position, and a correction unit that corrects an orientation of the image data so that a longer side of the image data may coincide with a longer side of an image formation area of the liquid crystal panel if the determination unit determines that the detected position is the predetermined position.

4 Claims, 8 Drawing Sheets

PROJECTOR AND DISPLAY CONTROL METHOD FOR PROJECTOR WITH ORIENTATION CORRECTION

The entire disclosure of Japanese Patent Application No. 2012-267977, filed Dec. 7, 2012 is expressly incorporated by reference herein.

BACKGROUND

1. Technical Field

The present invention relates to a projector and a display control method for the projector.

2. Related Art

Projectors that are connected to image output devices such as PCs (Personal Computers) and display images based on image data input from the image output devices on projected surfaces such as wall surfaces and floor surfaces have been known (for example, see Patent Document 1 (Japanese Patent No. 4772917).

An image display device disclosed in Patent Document 1 is housed in a drive bay of a portable information processing unit, and displays an image based on image data input from the portable information processing unit on a screen. The image display device has a control unit housed in the drive bay and an optical engine unit that forms and projects images connected via a hinge part, and is adapted to be switched to one of wall surface upward projection, ceiling surface projection, wall surface downward projection, and floor surface projection by adjustment of the angle of the optical engine unit.

The images that can be displayed by the projector include portrait images displayed in portable display devices such as smartphones and tablet terminals. On the other hand, the images formed by light modulation devices of the typical projectors are landscape images with an aspect ratio of 16:9 or 4:3, for example.

In the case where a portrait image is displayed by the typical projector, it is considered that an image in which the portrait image is placed at the center and black areas are set in the right and left areas is formed and projected. However, in this case, there is a problem that the fraction of the portrait image in the display image is lower and observation of the portrait image is harder.

SUMMARY

An advantage of some aspects of the invention is to provide a projector that facilitates observation of images and a display control method for the projector.

A projector according to a first aspect of the invention is a projector that projects an image including a light source, a light modulation device that modulates light output from the light source and forms an image in response to input image data, a projection optical device that projects the image formed by the light modulation device, a control device that controls the light modulation device, and a position detection device that detects a position of the projector, wherein the control device includes a determination unit that determines whether or not the position detected by the position detection device is a predetermined position, and a correction unit that corrects an orientation of the image data so that a longer side of the image data may coincide with a longer side of an image formation area of the light modulation device if the determination unit determines that the detected position is the predetermined position.

According to the first aspect, if the determination unit determines that the position detected by the position detection unit is the predetermined position, the correction unit corrects the orientation of the image data so that the longer side of the input image data may coincide with the longer side of the image formation area in the light modulation device. Thereby, in either case where the image data is the portrait image data or the landscape portrait image data, the image in response to the image data may be formed by the entire image formation area. Therefore, the portrait image in response to the portrait image data is formed by the entire image formation area and projected by the projection optical device, and thus, the portrait image may be formed and projected to be larger than the portrait image formed in the center area in the landscape image formation area, and observation of the portrait image may be made easier.

In the first aspect, it is preferable that the predetermined position is a position when an image is projected on a projected surface along a horizontal surface, and the correction unit has a regulation part that regulates the correction of the image data if the determination unit determines that the detected position is the position when the image is projected on the projected surface along a vertical surface.

Here, in the case where the image projected on the projected surface along the horizontal surface is observed, a user generally observes the displayed image in the orientation in which the upside and the downside of the image coincide with the front side and the rear side of the user. However, in the case where the image projected by horizontal surface projection is observed by a plurality of observers, the image is often surrounded and observed, and thus, observation of the portrait image is easier in the case where the portrait image is displayed by the entire projection image than in the case where the portrait image is displayed at the center of the projection image. Therefore, when the predetermined position is the horizontal surface projection position, the observation of the portrait image is easier.

On the other hand, in the case where the image projected on the projected surface along the vertical surface is observed, the user generally observes the projected image in the orientation in which the upside and the downside of the projected image coincide with the upside and the downside in the vertical direction. Accordingly, if the orientation of the image is corrected by the correction unit and the upside and the downside of the projected image do not coincide with the upside and the downside in the vertical direction, the observation of the image becomes harder.

In contrast, if the detected position is determined as the position in which the image is projected on the projected surface along the vertical surface, the regulation part regulates the correction by the correction unit. Thereby, the image in response to the input image data may be displayed in the orientation for easy observation.

In the first aspect, it is preferable that the correction unit has a shape correction part that performs distortion correction of correcting distortion generated in the projected image on the image data based on a detection result of the position detection device.

Note that, as the distortion correction performed by the shape correction part, trapezoidal distortion correction and bow distortion correction may be exemplified.

According to the first aspect of the configuration described above, the shape correction part performs the distortion correction on the image data based on the detection result of the position detection device. Thereby, the image may be displayed in a condition for easier observation.

A display control method according to a second aspect of the invention is a display control method for a projector including a light source, a light modulation device that modulates light output from the light source and forms an image in response to input image data, a projection optical device that projects the image formed by the light modulation device, and a control device that controls the light modulation device. The method includes: allowing the control device to execute detection of a position of the projector, determination whether or not the position detected in the detection of a position is a predetermined position, and correction of an orientation of the image data so that a longer side of the image data coincides with a longer side of an image formation area of the light modulation device if the detected position is determined as the predetermined position in the determination.

According to the second aspect, the projector performs the display control method, and thereby, exerts the same effect as that of the projector according to the first aspect.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, one embodiment of the invention will be explained with reference to the drawings.

Schematic Configuration of Projector

Figure 1:
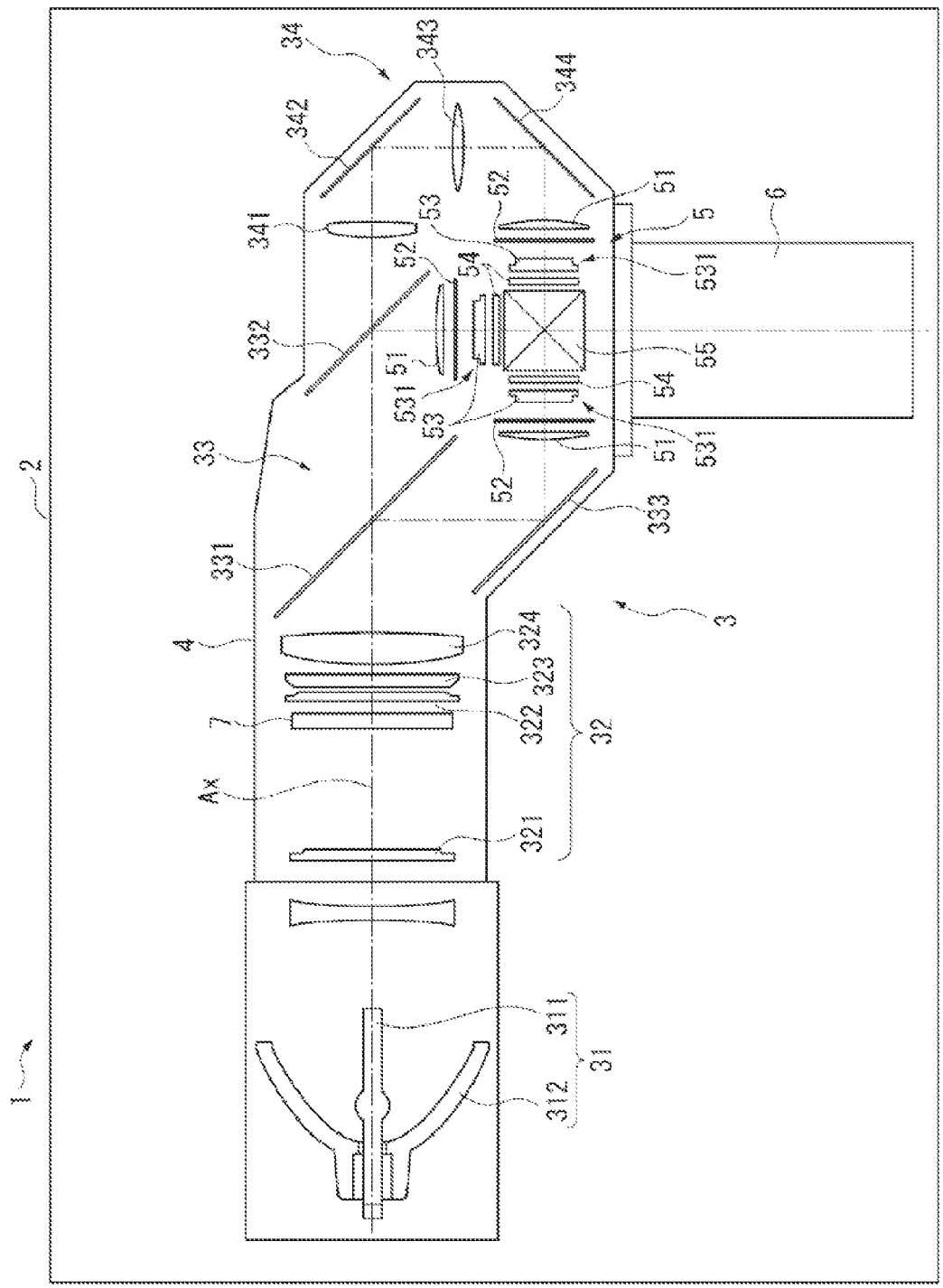
FIG. 1 is a schematic diagram showing a configuration of a projector according to one embodiment of the invention.

FIG. 1 is a schematic diagram showing a configuration of a projector 1 according to the embodiment.

The projector 1 according to the embodiment modulates light output from a light source 31, which will be described later, and enlarges and projects the modulated light on a projected surface such as a screen, and thereby, displays an image on the projected surface. The projector 1 includes a casing 2 and an optical unit 3 housed within the casing 2 as shown in FIG. 1. In addition, though not shown in FIG. 1, the projector 1 includes a control device 100 (see FIG. 2) that controls the projector 1, a power supply device that supplies power to electronic components forming the projector 1, and a cooling device that cools objects to be cooled within the projector 1.

Configuration of Optical Unit

The optical unit 3 includes an optical component casing 4, the light source 31 and various optical devices 32 to 34 supported by the optical component casing 4, an electrooptical device 5, and a projection optical device 6.

Specifically, the optical component casing 4 includes a component housing member in which groove parts (not shown) for housing the various optical components are formed and a lid-like member that blocks the opening part for housing components formed in the component housing member, and these are formed using a synthetic resin or metal. In the optical component casing 4, the light source 31, an illumination optical device 32, a color separation optical device 33, and a relay optical device 34 are provided.

The light source 31 has a light source lamp 311 and a reflector 312, and outputs luminous flux to the illumination optical device 32.

The illumination optical device 32 homogenizes illuminance within an orthogonal surface with respect to the center axis of the luminous flux output from the light source 31. The illumination optical device 32 has a first lens array 321, a dimming device 7, a second lens array 322, a polarization conversion element 323, and a superimposing lens 324.

The first lens array 321 (not shown in details) has a configuration in which a plurality of first small lenses that divide the luminous flux output from the light source 31 into a plurality of partial luminous fluxes are arranged in a matrix form. Further, the second lens array 322 has a configuration in which a plurality of second small lenses corresponding to the respective first small lenses of the first lens array 321 are arranged in a matrix form. Further, the second lens array 322 and the superimposing lens 324 irradiate an image formation area of a liquid crystal panel 53, which will be described later, with incident respective partial luminous fluxes for uniform illumination of the image formation area.

The polarization conversion element 323 equalizes the polarization directions of the incident lights into one direction.

The dimming device 7 adjusts the amount of light incident to the second lens array 322 and to the liquid crystal panel 53 by shielding at least part of the lights incident to the second lens array 322 via the first lens array 321.

The color separation optical device 33 separates the luminous flux entering from the illumination optical device 32 into three color lights of red (R), green (G), and blue (B). The color separation optical device 33 has dichroic mirrors 331, 332 and a reflection mirror 333.

The relay optical device 34 is provided in an optical path of the red light of the separated three color lights. The relay optical device 34 has a light incident-side lens 341, a relay lens 343, and reflection mirrors 342, 344. The relay optical device 34 suppresses loss of the red light because the optical path of the separated red light (the optical path to the liquid crystal panel 53) is longer than the optical paths of the other color lights.

The electrooptical device 5 respectively modulates the separated respective color lights in response to image information, and then, combines the modulated respective color lights. The electrooptical device 5 has three field lenses 51, three light incident-side polarizers 52, three liquid crystal panels 53 as light modulation devices, and three light-exiting side polarizers 54 provided for the respective color lights, and a cross dichroic prism 55 as a color combining optical device that combines the modulated respective color lights. Here, each of the three liquid crystal panels 53 has a rectangular image formation area 531.

The projection optical device 6 is a projection lens that enlarges and projects the luminous flux combined by the cross dichroic prism 55 (luminous flux forming the image) on the above described projected surface.

These light source 31, respective optical devices 32 to 34, electrooptical device 5, and projection optical device 6 are positioned in predetermined locations with respect to the illumination optical axis Ax set within the optical component casing 4. Accordingly, when the light source 31 is housed within the optical component casing 4, the center axis of the luminous flux output from the light source 31 is aligned with the illumination optical axis Ax.

Internal Configuration of Projector

Figure 2:
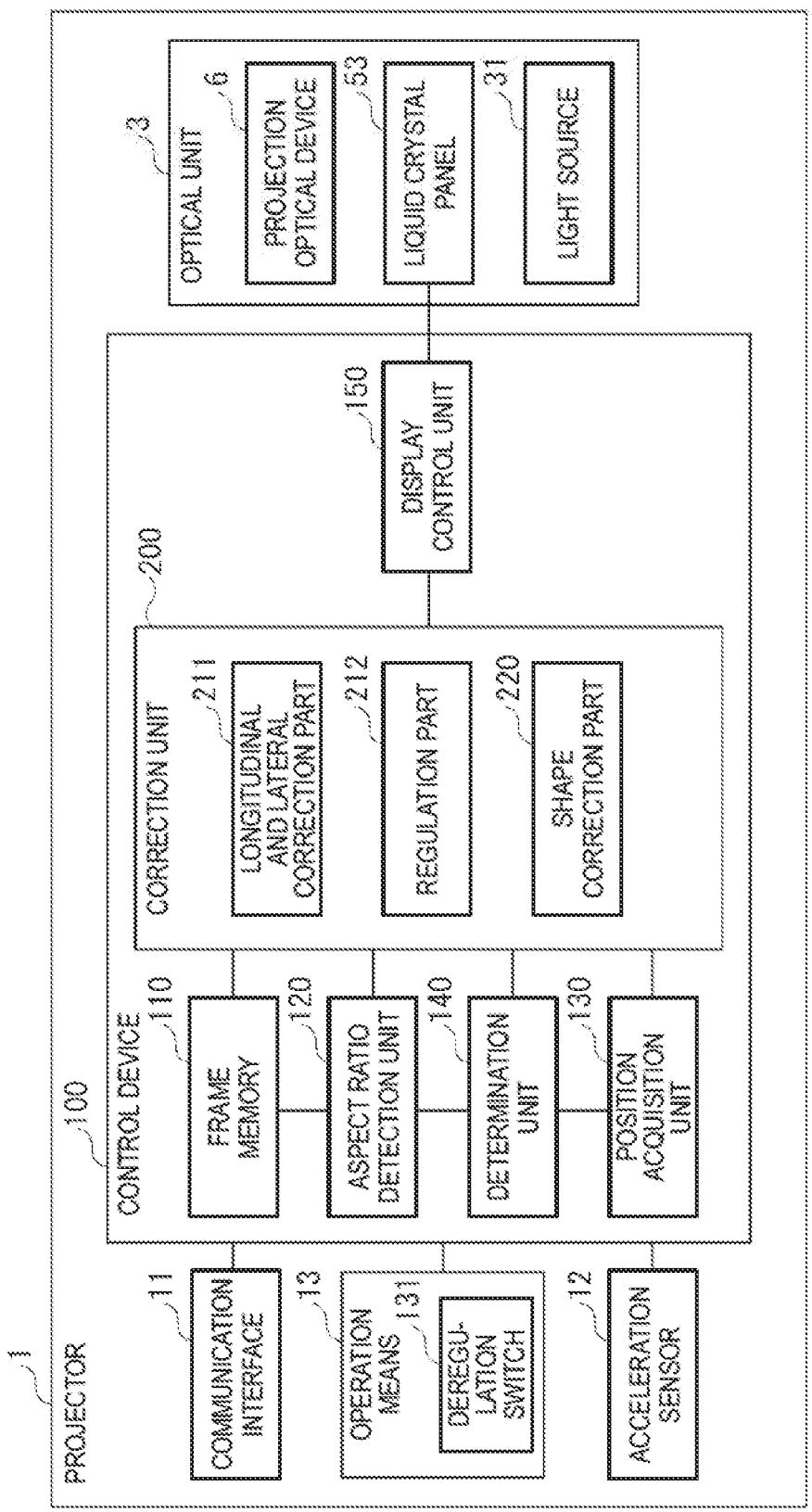
FIG. 2 is a block diagram showing a configuration of the projector in the embodiment.

FIG. 2 is a block diagram showing a configuration of the projector 1 in the embodiment.

The projector 1 can take a vertical surface projection position for projection of an image on a surface along the vertical surface and a horizontal surface projection position for projection of an image on a surface along the horizontal surface, and display a portrait image and a landscape image in the respective positions. To realize the function, the projector 1 has the control device 100, a communication interface 11 that transmits and receives image data between an external device and itself, an acceleration sensor 12, and an operation unit 13 as shown in FIG. 2 in addition to the optical unit 3 etc.

Configuration of Operation Unit

The operation unit 13 includes an operation panel provided on the outer surface of the casing 2, and various switches for operation of the projector 1 are provided on the operation unit 13. As the switches, the operation unit 13 has a deregulation switch 131 in addition to a power supply switch etc.

The deregulation switch 131 is, though the details will be described later, a key that is turned on when the orientation correction on the image data is performed by the control device 100 and turned off when the correction is not performed. Further, the operation unit 13 outputs operation signals representing the statuses of the respective switches including the switch 131 to the control device 100.

Configuration of Communication Interface

The communication interface 11 is a communication unit that can make wired or wireless communication with external equipment. The communication interface 11 receives image data from an image output device such as a PC. Further, the communication interface 11 receives image data transmitted from a portable display device such as a smartphone or a tablet terminal via wireless communication or the like. Further, the communication interface 11 outputs the received image data to the control device 100. As the communication interface 11, a wired or wireless LAN (Local Area Network) module or a module compliant with standards of USB (Universal Serial Bus) or the like may be exemplified.

Configuration of Acceleration Sensor

The acceleration sensor 12 detects the position of the projector 1 based on acceleration in three-dimensional directions (three axes orthogonal to one another) and outputs the detection result to the control device 100. That is, the acceleration sensor 12 forms a position detection device that detects the position of the projector 1.

Note that the configuration and the method of detecting the position of the projector 1 are not limited to those including the acceleration sensor 12. For example, when the projector 1 includes a leg part and the leg part is retractable from the bottom surface of the projector 1, the amount of projection of the leg part may be measured by an encoder or the like and the position may be detected based on the detection signal output from the encoder. Further, when the angle of the projection lens of the projector 1 can be changed in the elevation direction with respect to the main body, the elevation angle of the projection lens may be detected by a potentiometer or the like and the position may be detected based on its detection signal. Furthermore, the position may be detected in response to the input status of the switch to be pressed down when the projector is mounted on the installation surface.

Configuration of Control Device

The control device 100 is formed as a circuit board on which a CPU (Central Processing Unit) and a memory are mounted, for example, and controls the operation of the projector 1 autonomously or in response to the operation by the user. The control device 100 has a frame memory 110 formed as a part of the memory and further has respective functional units shown as an aspect ratio detection unit 120, a determination unit 140, a position acquisition unit 130, a correction unit 200, and a display control unit 150 in execution of programs stored in the memory by the CPU.

In the frame memory 110, image data received from outside by the communication interface 11 is drawn.

The aspect ratio detection unit 120 detects the aspect ratio of the image data drawn in the frame memory 110. That is, the aspect ratio detection unit 120 detects the longer side direction in the image data.

The position acquisition unit 130 acquires the detection result output from the acceleration sensor 12.

The determination unit 140 determines whether the position of the projector 1 is the position when the image is projected on the projected surface along the horizontal surface (horizontal surface projection) or the position when the image is projected on the projected surface along the vertical surface (vertical surface projection) based on the detection result acquired by the position acquisition unit 130.

Further, the determination unit 140 determines the upside and downside orientation of the projector 1 based on the detection result acquired by the position acquisition unit 130.

The correction unit 200 performs predetermined correction processing on the image data drawn in the frame memory 110 (hereinafter, may be referred to as "drawing data"). The correction unit 200 has a longitudinal and lateral correction part 211, a regulation part 212, and a shape correction part 220.

The longitudinal and lateral correction part 211 functions when the projection position of the projector 1 is determined as the horizontal surface projection by the determination unit 140, and corrects the orientation of the drawing data so that the longer side of the received image data may coincide with the longer side of the image formation area 531 of the liquid crystal panel 53 based on the aspect ratio detected by the aspect ratio detection unit 120.

In detailed description, when the horizontal surface projection is determined and the received image data is portrait image data, the longitudinal and lateral correction part 211 rotates the drawing data to 90° so that the longer side of the image data may coincide with the longer side of the image formation area 531.

Note that, even when the horizontal surface projection is determined, if the received image data is landscape image data, the longitudinal and lateral correction part 211 does not rotate the drawing data because the longer side of the image data coincides with the longer side of the image formation area 531.

The regulation part 212 regulates the correction processing by the longitudinal and lateral correction part 211 when the determination result by the determination unit 140 is the vertical surface projection.

Note that, when the determination result by the determination unit 140 is the vertical surface projection, the orientation of the drawing data is corrected so that the longitudinal orientation of the image data may coincide with the longitudinal orientation of the image formed by the image formation area 531 and projected by the projection optical device.

The shape correction part 220 performs distortion correction (trapezoidal distortion correction and bow distortion correction) of correcting distortion generated in the projected image on the image data drawn in the frame memory 110 based on the detection result output from the acceleration sensor 12.

The display control unit 150 performs drive control of the liquid crystal panel 53, outputs the image signal in response to the image data drawn in the frame memory 110 to the liquid crystal panel 53, and allows the image formation area 531 of the liquid crystal panel 53 to form the image in response to the image data.

Display Control Method for Projector

Figure 3:
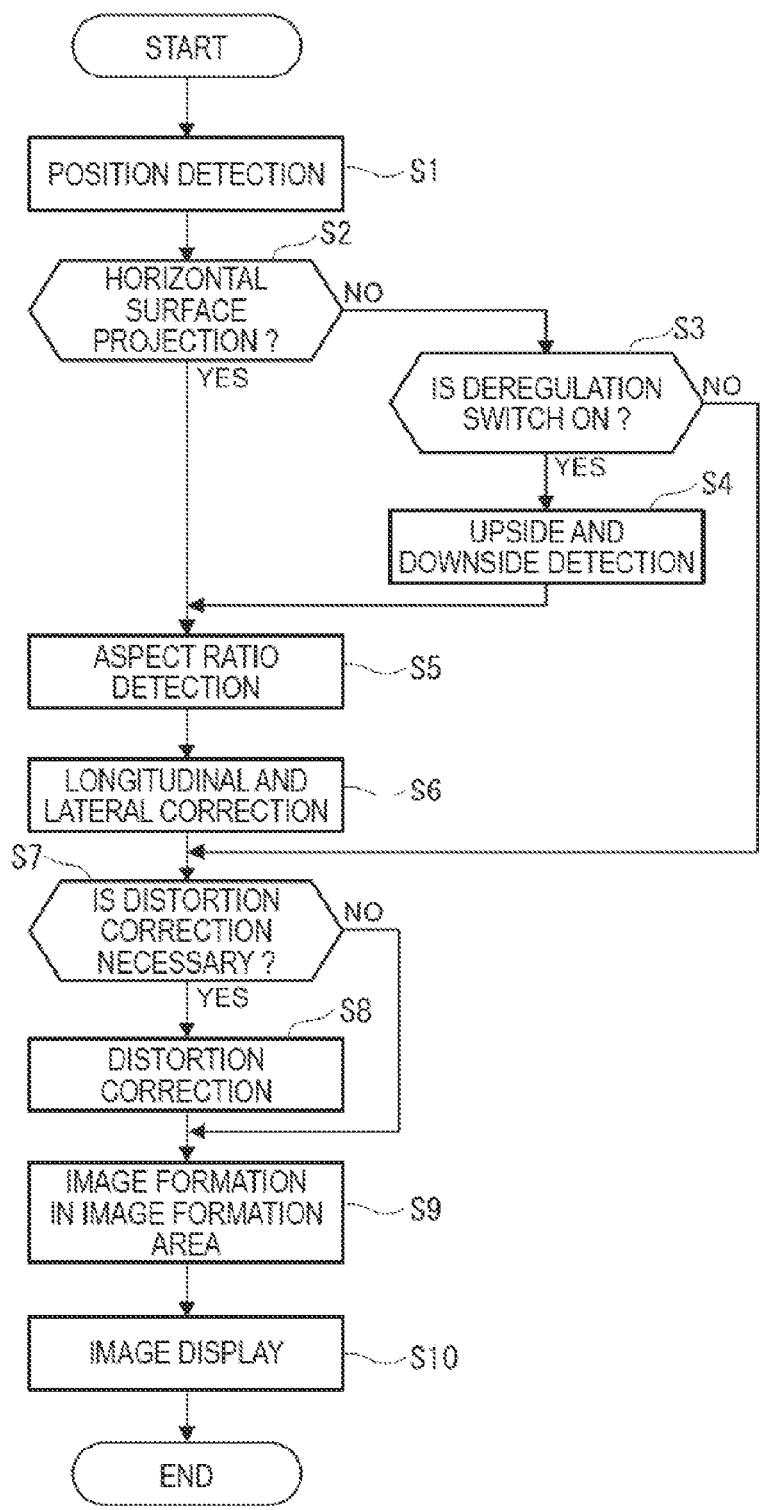
FIG. 3 is a flowchart showing a display control method in the embodiment.

FIG. 3 is a flowchart for explanation of a display control method for the projector according to the embodiment.

Here, suppose that the image data received by the communication interface 11 is drawn in the frame memory 110.

First, the acceleration sensor 12 detects the position of the projector 1 (step S1). Then, the position acquisition unit 130 acquires the detection result of the acceleration sensor 12.

Then, the determination unit 140 determines whether or not the current projection position is the horizontal surface projection position based on the detection result acquired by the position acquisition unit 130 (step S2).

In the determination processing at step S2, if the horizontal surface projection position is determined, the control device 100 shifts the processing to step S5.

If the determination at step S2 is NO, i.e., the current projection position is determined as not the horizontal surface projection position (as the vertical surface projection position), the regulation part 212 determines whether or not the deregulation switch 130 is on (step S3).

If the determination at step S3 is YES, i.e., the switch 131 is determined to be on, the regulation part 212 deregulates the correction by the longitudinal and lateral correction part 211. Then, the determination unit 140 detects the upside and downside orientation of the projected image based on the detection result acquired by the position acquisition unit 130 (step S4).

If the determination at step S3 is NO, the regulation part 212 regulates the correction by the longitudinal and lateral correction part 211.

Then, the control device 100 shifts the processing to step S5.

At step S5, the aspect ratio detection unit 120 detects the aspect ratio of the image data drawn in the frame memory 110 (step S5).

Then, the longitudinal and lateral correction part 211 corrects the orientation of the drawing data so that the longer side of the received image data may coincide with the longer side of the image formation area 531 of the liquid crystal panel 53 based on the aspect ratio detected by the aspect ratio detection unit 120 (step S6). Here, when the detection of the upside and downside orientation of the projector 1 is performed at step S4, the longitudinal and lateral correction part 211 further corrects the upside and downside orientation of the drawing data with the upside and downside orientation of the projector 1 determined by the determination unit 140. Thereby, the upside and the downside of the projected image coincide with the upside and the downside when the image is observed.

After step S6 or if the determination result at step S3 is NO, the shape correction part 220 determines whether or not the distortion correction is necessary for the drawing data (step S7).

If the determination result at step S7 is YES, i.e., the distortion correction is determined to be necessary, the shape correction part 220 corrects the shape of the drawing data based on the detection result output from the acceleration sensor 12 (step S8). Then, the control device 100 shifts the processing to step S9.

Note that, if the distortion correction is determined to be not necessary, similarly, the control device 100 shifts the processing to step S9.

At step S9, the display control unit 150 performs drive control of the liquid crystal panel 53, outputs the image signal in response to the drawing data to the liquid crystal panel 53, and allows the image formation area 531 of the liquid crystal panel 53 to form the image in response to the image data (step S9).

Then, the control device 100 controls the optical unit 3 and projects the image formed in the image formation area 531 on the projected surface by the projection optical device 6. Thereby, the image is displayed on the projected surface (step S10).

Example of Screen of Smartphone

Figure 4:
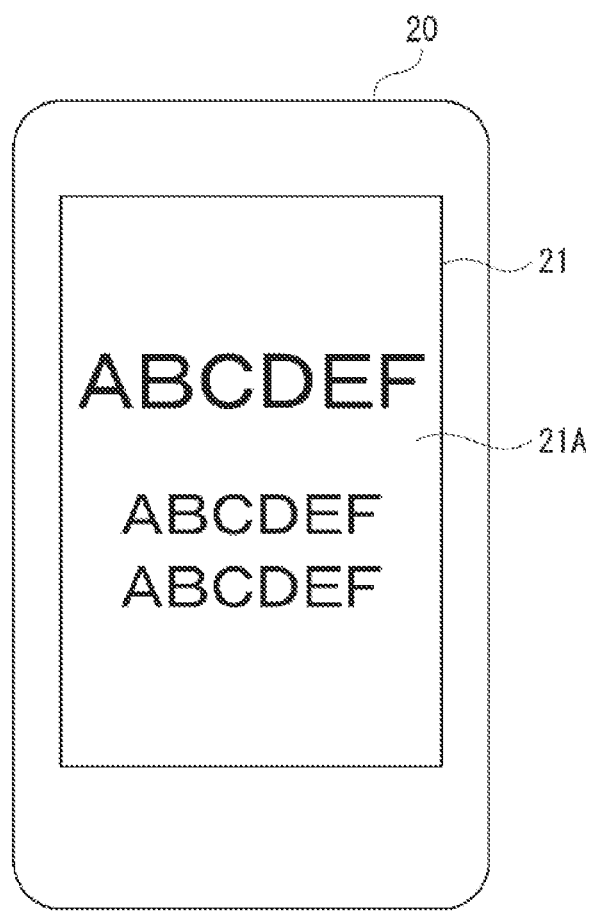
FIG. 4 shows an example of a screen of a smartphone in the embodiment.

FIG. 4 shows an example of a screen of a smartphone.

The screen 21 of the smartphone 20 is vertically long and many of the displayed images 21A are based on the portrait image data.

The projector 1 of the embodiment also receives image data output from a portable display device like the smartphone 20, and often processes portrait image data.

Example of Vertical Surface Projection

Figure 5:
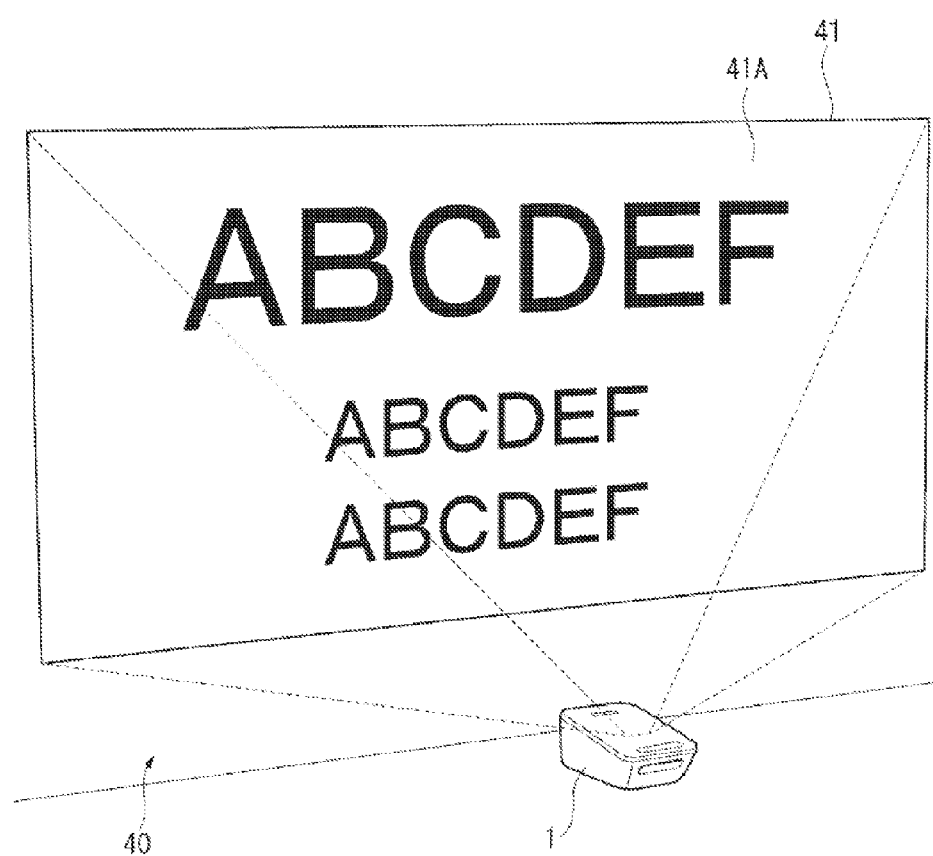
FIG. 5 shows an example of vertical surface projection in the embodiment.

FIG. 5 shows an example of vertical surface projection in the embodiment.

When the projector 1 is in the vertical surface projection position and the received image data is image data of a landscape image, as shown in FIG. 5, a projection image 41 formed by setting a landscape image 41A based on the image data in the correct orientation is displayed on a wall surface 40. In this case, the landscape image 41A is an image formed by the entire of the above described image formation area 531.

Figure 6:
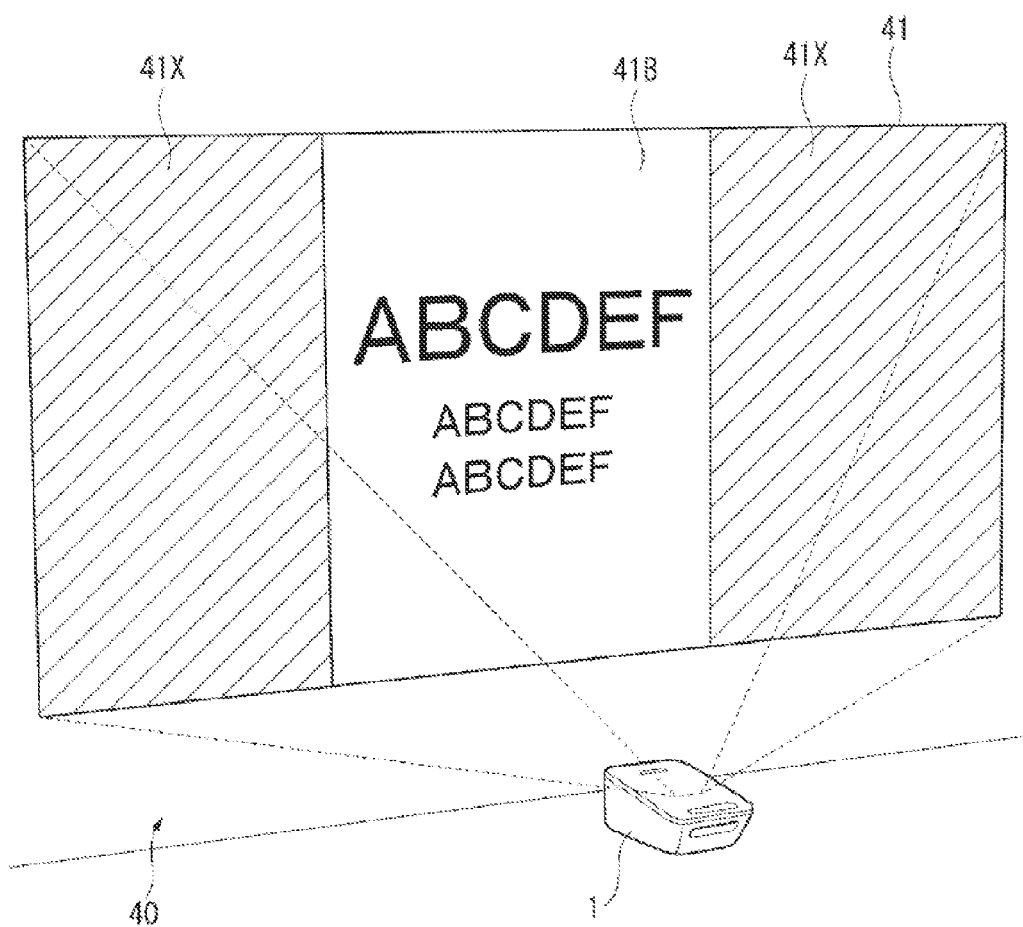
FIG. 6 shows another example of vertical surface projection in the embodiment.

FIG. 6 shows another example of vertical surface projection in the embodiment.

When the projector 1 is in the vertical surface projection position and the received image data is image data of a portrait image, as shown in FIG. 6, a projection image 41 formed by setting a portrait image 41B based on the image data at the center in the correct orientation is displayed on the wall surface 40. In the right and left areas of the portrait image 41B in the projection image 41, areas 41X for displaying black are set.

Figure 7:
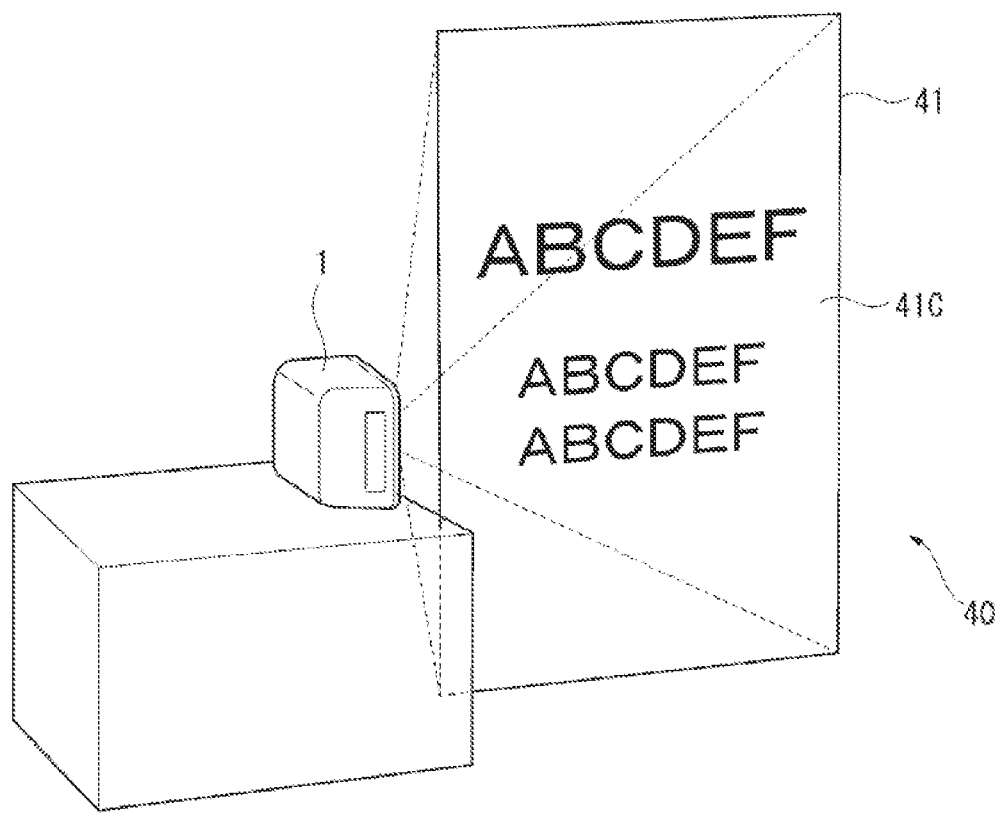
FIG. 7 shows yet another example of vertical surface projection in the embodiment.

FIG. 7 shows yet another example of vertical surface projection in the embodiment.

When the projector 1 is in the vertical surface projection position and the received image data is image data of a portrait image, as shown in FIG. 7, a projection image 41 formed by setting a portrait image 41C based on the image data in the correct orientation is displayed on the wall surface 40. In this case, the portrait image 41C is an image formed by the entire of the above described image formation area 531.

Example of Horizontal Surface Projection

Figure 8:
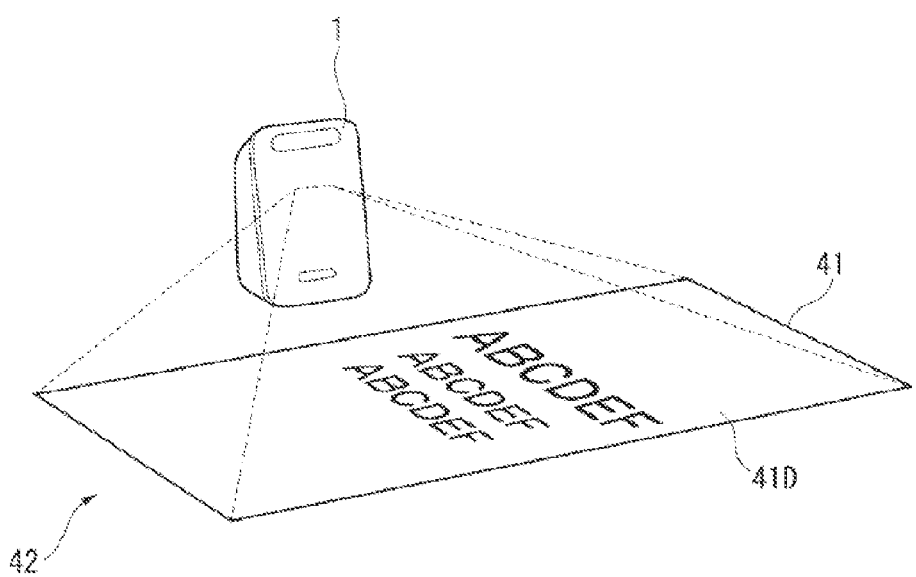
FIG. 8 shows an example of horizontal surface projection in the embodiment.

FIG. 8 shows an example of horizontal surface projection in the embodiment.

When the projector 1 is in the horizontal surface projection position and the received image data is image data of a portrait image, as shown in FIG. 8, a projection image 41 formed by setting a portrait image 41D based on the image data in a predetermined orientation is displayed on a floor surface 42. In this case, the portrait image 41D is an image formed by the entire of the above described image formation area 531.

Figure 9:
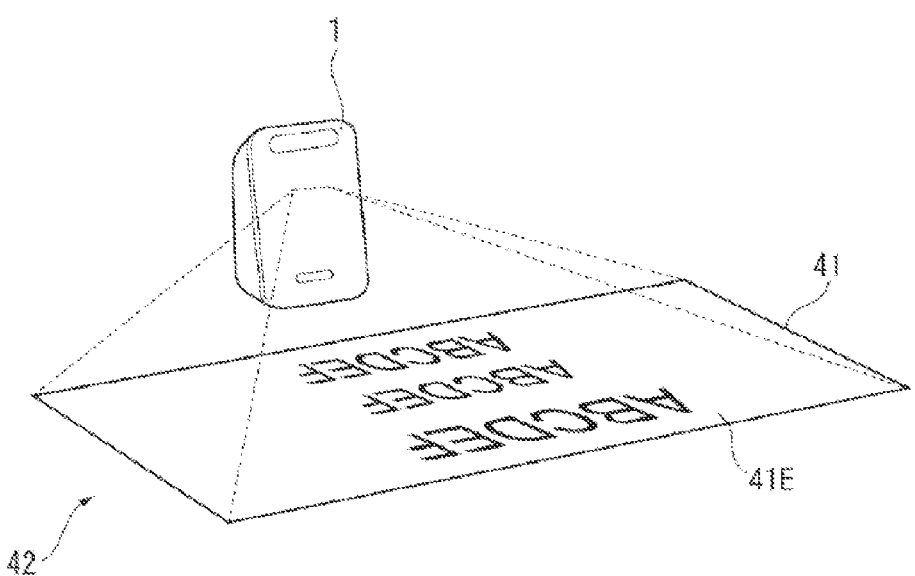
FIG. 9 shows another example of horizontal surface projection in the embodiment.

FIG. 9 shows another example of horizontal surface projection in the embodiment.

When the projector 1 is in the horizontal surface projection position and the received image data is image data of a landscape image, as shown in FIG. 9, a projection image 41 formed by setting a landscape image 41E based on the image data in a predetermined orientation is displayed on the floor surface 42. In this case, the landscape image 41E is an image formed by the entire of the above described image formation area 531.

Note that the anteroposterior direction of the image projected on the floor surface 42 is displayed in a predetermined direction and, for example, the direction may be rotated to 180° according to an observer's convenience.

The projector 1 according to the above described embodiment has the following advantages.

(1) If the determination unit 140 determines that the position detected by the acceleration sensor 12 is the horizontal surface projection position, the longitudinal and lateral correction part 211 corrects the orientation of the image data so that the longer side of the received image data may coincide with the longer side of the image formation area 531 in the liquid crystal panel 53. Thereby, in either case where the image data is portrait image data or landscape image data, the image in response to the image data may be formed by the entire image formation area 531. Therefore, the portrait image in response to the portrait image data is formed by the entire image formation area 531 and projected by the projection optical device 6, and thus, the portrait image may be formed and projected to be larger than the portrait image formed in the center area in the image formation area 531, and observation of the portrait image may be made easier.

(2) If the determination unit 140 determines that the detected position is the vertical surface projection position, the regulation part 212 regulates the correction by the longitudinal and lateral correction part 211. Thereby, the image in response to the received image data may be displayed on the projected surface along the vertical surface in the orientation for easy observation.

(3) The shape correction part 220 performs distortion correction on the received image data based on the detection result of the acceleration sensor 12. Thereby, the image may be displayed in a condition for easier observation.

Modifications of Embodiment

The invention is not limited to the above described embodiment, but the invention includes modifications, alterations, etc. in a range in which the purpose of the invention may be achieved.

In the embodiment, in the case of the vertical surface projection, whether or not to perform the correction processing of rotating the orientation of the image is determined in response to the input status of the deregulation switch 131, however, the invention is not limited to that. For example, the deregulation switch 131 is not provided and whether or not to perform the correction processing may be preset for the case of the vertical surface projection.

Here, depending on the position of the projector 1, the vertical surface projection includes the case of landscape projection in which the image formed by the entire image formation area 531 and projected by the projection optical device 6 is observed as a landscape image (projection shown in FIG. 5) and the case of portrait projection in which the image is observed as a portrait image (projection shown in FIG. 7).

On the other hand, a sensor that can detect the position of the projector 1 as the landscape projection and the position as the portrait projection may be provided and, if the vertical surface projection is determined based on the detection result by the sensor, whether the portrait projection or the landscape projection is further determined and the orientation of the image may be corrected in response to the determination result.

For example, in the case of the portrait projection, if the received image data is the portrait image data, the orientation of the drawing data is corrected so that the longer side of the image data may coincide with the longer side of the image formation area 531, and, if the received image data is the landscape image data, the orientation of the drawing data is corrected so that the shorter side of the image data may coincide with the longer side of the image formation area 531 and the image in response to the landscape drawing data is formed at the center of the image formation area 531. On the other hand, in the case of the landscape projection, if the received image data is the portrait image data, the image in response to the portrait image data is formed at the center of the image formation area 531, and, if the received image data is the landscape image data, the orientation of the drawing data is not corrected but the longer side of the image data is made to coincide with the longer side of the image formation area 531. Thereby, even in the respective cases of the portrait projection and the landscape projection, observation of the image may be made easier.

In the embodiment, the position of the projector 1 is detected based on the detection result of the acceleration sensor 12, however, the invention is not limited to that. For example, as described above, the position of the projector 1 may be detected by the encoder and the potentiometer, and according to the status of the switch.

In the embodiment, when the portrait image is formed at the center of the image formation area 531, both ends of the image formation area 531 are used as the areas for displaying black, however, the invention is not limited to that. For example, the ends of the image formation area 531 may be used as areas for displaying other colors or areas in which light is shielded and no image is formed.

In the embodiment, when the aspect ratio of the image formation area 531 does not coincide with the aspect ratio of the received image data, the correction unit 200 may form an image in which black areas are set at the upside and the downside or at the right side and the left side of the drawing data in response to the image data so that the aspect ratio of the image formation area 531 may coincide with the aspect ratio of the formed image in addition to the correction of the orientation and the shape of the drawing data. Further, when the resolution of the image formation area 531 does not coincide with the resolution of the received image data, the correction unit 200 may form an image by enlarging or reducing the drawing data in response to the image data so that the resolution of the image formation area 531 may coincide with the resolution of the formed image.

In the embodiment, the shape correction part 220 determines whether or not the shape correction is necessary based on the position of the projector 1 detected by the acceleration sensor 12, however, the invention is not limited to that. For example, the shape correction processing may be performed in response to the input operation by a user of a key provided in the operation unit 13.

In the embodiment, the projector 1 includes the three liquid crystal panels 53, however, the invention is not limited to that. That is, the invention may be applied to a projector using one, two, four, or more liquid crystal panels.

Further, in the embodiment, the optical unit 3 having a nearly L-shape in the plan view has been explained, however, not limited to that. For example, a configuration having a nearly U-shape in the plan view may be employed.

Furthermore, in the embodiment, the transmissive liquid crystal panel 53 with different luminous flux incident-surface and luminous flux exiting-surface is used, however, a reflective liquid crystal panel having the same luminous flux incident-surface and luminous flux exiting-surface may be used.

In the embodiment, the projector 1 including the liquid crystal panel 53 as the light modulation device has been exemplified, however, a light modulation device having another configuration may be employed as long as the light modulation device modulates incident luminous flux in response to image information and forms an optical image. For example, the invention may be applied to a projector using another light modulation device such as a device using a micro mirror other than the liquid crystal light modulation device.

The invention may be used for projectors.

What is claimed is:

1. A projector that projects an image, comprising:
a light source;
a light modulation device that modulates light output from the light source and forms an image in response to input image data;
a projection optical device that projects the image formed by the light modulation device;
a control device that controls the light modulation device; and
a position detection device that detects a projection position of the projector as one of a vertical projection position for projection of the image on a vertical surface and a horizontal projection position for projection of the image on a horizontal surface,
wherein the control device includes
a determination unit that determines whether the projection position detected by the position detection device is a predetermined position, and
a correction unit that corrects an orientation of the image data so that a longer side of the image data coincides with a longer side of an image formation area of the light modulation device if the determination unit determines that the detected projection position is the predetermined position.

2. The projector according to claim 1, wherein the predetermined position is the horizontal projection position, and
the correction unit has a regulation part that regulates the correction of the image data if the determination unit determines that the detected projection position is the vertical projection position.

3. The projector according to claim 1, wherein the correction unit has a shape correction part that performs distortion correction of correcting distortion generated in the projected image on the image data based on a detection result of the position detection device.

4. A display control method for a projector including a light source, a light modulation device that modulates light output from the light source and forms an image in response to input image data, a projection optical device that projects the image formed by the light modulation device, and a control device that controls the light modulation device, the method comprising:
allowing the control unit to execute
detection of a projection position of the projector as one of a vertical projection position for projection of the image on a vertical surface and a horizontal projection position for projection of the image on a horizontal surface;
determination of whether the detected projection position is a predetermined position; and
correction of an orientation of the image data so that a longer side of the image data coincides with a longer side of an image formation area of the light modulation device if the detected projection position is determined to be the predetermined position.

* * * * *